US007660744B2

(12) United States Patent
Philippe et al.

(10) Patent No.: US 7,660,744 B2
(45) Date of Patent: Feb. 9, 2010

(54) METHOD AND SYSTEM FOR INTEGRATING TRANSACTION MECHANISMS OVER MULTIPLE INTERNET SITES

(75) Inventors: Yan Philippe, Cupertino, CA (US); Rakesh Mathur, Fremont, CA (US); Anand Rajaraman, Mountain View, CA (US)

(73) Assignee: Amazon.com, Inc., Seattle, WA (US)

( * ) Notice: Subject to any disclaimer, the term of this patent is extended or adjusted under 35 U.S.C. 154(b) by 678 days.

(21) Appl. No.: 11/069,923

(22) Filed: Mar. 1, 2005

(65) Prior Publication Data

US 2005/0210022 A1 Sep. 22, 2005

Related U.S. Application Data

(60) Continuation of application No. 10/602,479, filed on Jun. 23, 2003, now Pat. No. 6,882,981, and a division of application No. 09/066,739, filed on Mar. 20, 1998, now Pat. No. 6,643,624.

(60) Provisional application No. 60/077,322, filed on Mar. 9, 1998, provisional application No. 60/077,655, filed on Mar. 11, 1998.

(51) Int. Cl.
*G06Q 30/00* (2006.01)

(52) U.S. Cl. ............................... 705/26; 705/1; 705/27; 707/1; 707/4

(58) Field of Classification Search ................... 705/26, 705/27
See application file for complete search history.

(56) References Cited

U.S. PATENT DOCUMENTS 5,293,429 A 3/1994 Pizano et al.
5,297,039 A 3/1994 Kanaegami et al.
5,694,551 A 12/1997 Doyle et al.
5,708,780 A 1/1998 Levergood et al.

(Continued)

FOREIGN PATENT DOCUMENTS

EP 0 807 891 11/1997

(Continued)

OTHER PUBLICATIONS

"The once and future mall." Economist, vol. 345, No. 8041, pp. 64-68, Nov. 1, 1997.*

(Continued)

*Primary Examiner*—Jason Dunham
(74) *Attorney, Agent, or Firm*—Knobbe Martens Olson & Bear LLP

(57) ABSTRACT

A method is provided for effecting transactions across multiple vendors in an integrated environment, wherein the user may purchase each of a plurality of items the user finds independent of the vendors. The user's selections are received from the user and mapped to a selected set of vendors. When the user is finished, she invokes a check-out application to fill in one or many order entry forms for each of the relevant vendors whose goods the user selected during the course of shopping. The check-out application uses common information, such as name, address and credit card number, previously provided by the user in order to fill in the order entry forms for each vendor without requiring the user to fill in these forms. Finally, the check-out application tracks confirmation numbers in a common information store.

39 Claims, 12 Drawing Sheets

303
322 Search Web Sites for Items of Interest to User
324 Display Search Results to User with Capability to Make Selections
325 Add to the List of Items to Purchase by Clicking on "Add to Cart" Button
326 Parse the Selection for Data about the Request
328 Add Data to User Selection Database
330 Is the User Done? No / Yes
332 Any User Transaction to Process? No / Yes
End
334 Initiate a Transaction with Appropriate Site to User Request

U.S. PATENT DOCUMENTS

| | | | | |
|---|---|---|---|---|
| 5,710,887 | A | 1/1998 | Chelliah et al. | |
| 5,715,314 | A | 2/1998 | Payne et al. | |
| 5,724,424 | A | 3/1998 | Gifford | |
| 5,732,398 | A | 3/1998 | Tagawa | |
| 5,745,681 | A | 4/1998 | Levine et al. | |
| 5,758,328 | A | 5/1998 | Giovannoli | |
| 5,768,578 | A * | 6/1998 | Kirk et al. | 707/100 |
| 5,793,888 | A | 8/1998 | Delanoy | |
| 5,794,207 | A | 8/1998 | Walker et al. | |
| 5,794,259 | A * | 8/1998 | Kikinis | 715/207 |
| 5,809,483 | A | 9/1998 | Broka et al. | |
| 5,832,459 | A | 11/1998 | Cameron et al. | |
| 5,845,263 | A | 12/1998 | Camaisa et al. | |
| 5,850,446 | A | 12/1998 | Berger et al. | |
| 5,864,871 | A * | 1/1999 | Kitain et al. | 707/104.1 |
| 5,870,717 | A | 2/1999 | Wiecha | |
| 5,884,309 | A * | 3/1999 | Vanechanos, Jr. | 707/10 |
| 5,889,863 | A | 3/1999 | Weber | |
| 5,890,139 | A | 3/1999 | Suzuki et al. | |
| 5,897,622 | A | 4/1999 | Blinn et al. | |
| 5,960,411 | A * | 9/1999 | Hartman et al. | 705/26 |
| 5,963,949 | A | 10/1999 | Gupta et al. | |
| 6,029,141 | A | 2/2000 | Bezos et al. | |
| 6,085,186 | A | 7/2000 | Christianson et al. | |
| 6,088,700 | A | 7/2000 | Larsen et al. | |
| 6,092,053 | A | 7/2000 | Boesch et al. | |
| 6,102,969 | A | 8/2000 | Christianson et al. | |
| 6,119,101 | A * | 9/2000 | Peckover | 705/26 |
| 6,199,079 | B1 | 3/2001 | Gupta et al. | |
| 6,304,870 | B1 * | 10/2001 | Kushmerick et al. | 707/4 |
| 6,704,906 | B1 * | 3/2004 | Yankovich et al. | 715/222 |
| 7,200,578 | B2 * | 4/2007 | Paltenghe et al. | 705/74 |

FOREIGN PATENT DOCUMENTS

| | | |
|---|---|---|
| GB | 2 315 351 | 1/1998 |
| WO | WO 98/21679 | 5/1998 |

OTHER PUBLICATIONS

Tweney, Dylan. "Shopping agents help consumers find the best deals." InfoWorld, vol. 19, No. 49, p. 98, Dec. 8, 1997.*

Machlis, Sharon. "Agents' surf web for best online buys." Computerworld, vol. 31, No. 49, pp. 1, 16, Dec. 8, 1997.*

"*The Once and Future Mall*." Economist, vol. 345, No. 8041, pp. 64-68, Nov. 1, 1997.

"*The Promise of Internet Megastores*." EIU ViewsWire, Nov. 3, 1997.

Karpinski, R., "*Excite Scoops Up NetBot Shopping Agent*." Intel Developer Services, Oct. 16, 1997 [Retrieved from wysiwyg:??47/ http://www.internetwk.com/news/news1016-7.htm on Apr. 12, 2001].

Tweney, D., "*Shopping Agents Help Consumers Find the Best Deals*." InfoWorld, vol. 19, No. 49, p. 98, Dec. 8, 1997.

Machlis, S., "*Agents Surf Web for Best Online Buys*." Computerworld, vol. 31, No. 49, pp. 1, 16, Dec. 8, 1997.

Walter, M., "*Junglee Tries to Tame the Data Jungle*." Seybold Report on Internet Publishing, No. 12, p. 5(3), Aug. 1997.

"*Ingram Micro Adds Powerful Electronic Commerce Tools to Its Web Site*." Business Wire, p. 05050287, May 5, 1997.

Frook, J. E., "*A Wholesale Extranet—A Sweeping Web-Based Project is Helping Computer Distributor Ingram Micro Redefine Its Role in the Supply Chain*." Communications Week, pp. 1+, Jun. 9, 1997.

Giacoppo, L., *Product Release for CheckOut! Posted on the Internet*<URL:http//:times.30.deja.com>, Jul. 1997.

"Netbot Unveils Jango Tool for Shopping on the Web," http://www.cbronline.com/news, Computer Business Review, Jul. 29, 1997.

* cited by examiner

Figure 2A:
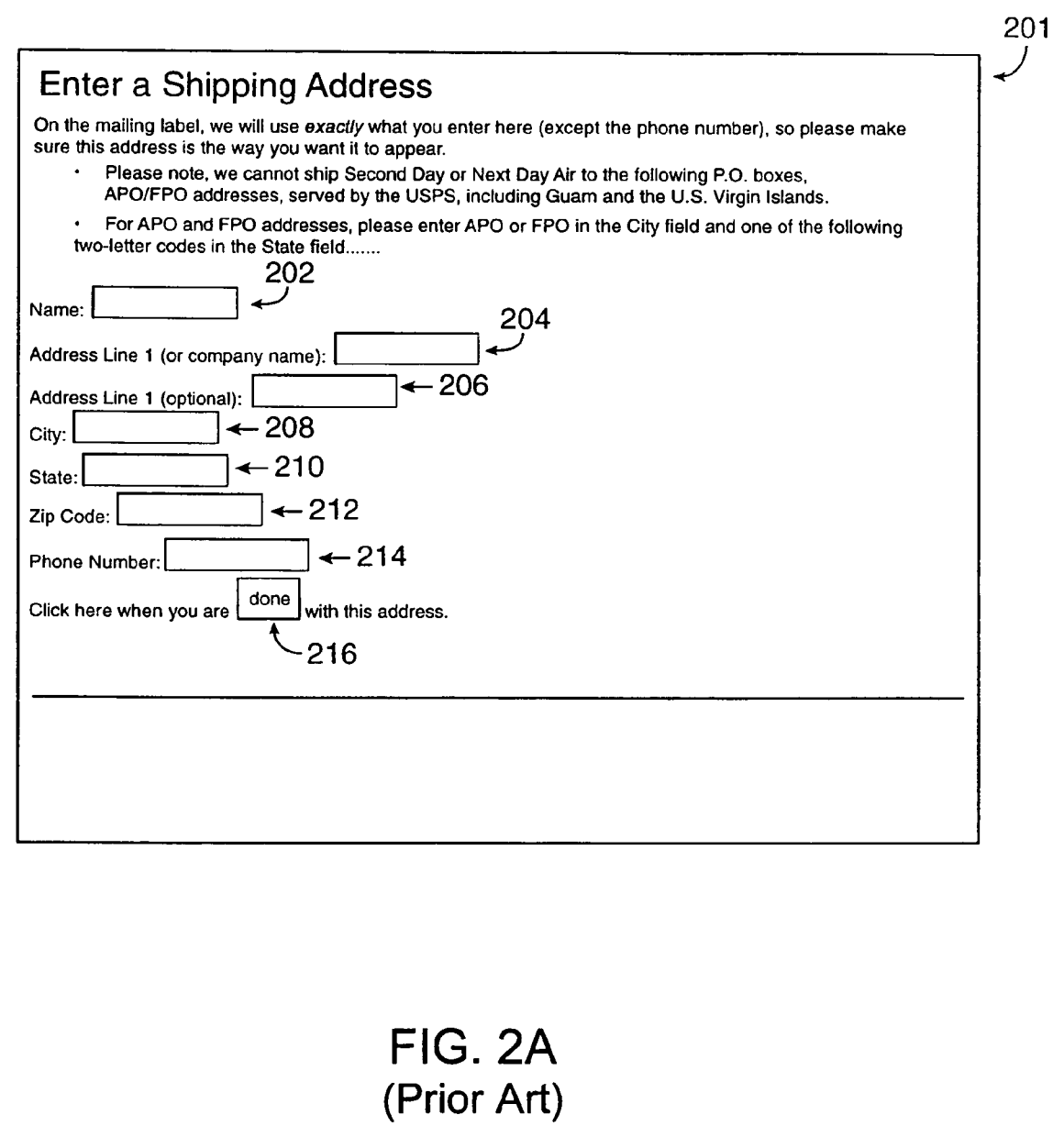

201

Enter a Shipping Address

On the mailing label, we will use *exactly* what you enter here (except the phone number), so please make sure this address is the way you want it to appear.

- Please note, we cannot ship Second Day or Next Day Air to the following P.O. boxes, APO/FPO addresses, served by the USPS, including Guam and the U.S. Virgin Islands.
- For APO and FPO addresses, please enter APO or FPO in the City field and one of the following two-letter codes in the State field.......

Name: [ ] 202

Address Line 1 (or company name): [ ] 204

Address Line 1 (optional): [ ] 206

City: [ ] 208

State: [ ] 210

Zip Code: [ ] 212

Phone Number: [ ] 214

Click here when you are [done] with this address. 216

Account Establishment

Name: [ ] Phone: [ ] Email Address: [ ]

Choose a password to use with Powells. Password: [ ]

Shipping Address: ⦿ Residential: ○ Business

Street Address: [ ] City: [ ] State/Province: [ ] Zip Code/Postal Code: [ ] Country: [US]

Alternate Email (optional): [ ] Company (optional): [ ]

Shipping (check out our shipping rates):

220

| | | | | |
|---|---|---|---|---|
| Continental United States | ○ UPS Ground | ○ UPS Next Day Air | ○ UPS 2nd Day Air | ○ US Postal Service Bookrate (Uninsured) |
| International | ○ DHL WorldMail | ○ UPS Express | | ○ US Postal Service Surface |
| Alaska, Hawaii, Puerto Rico | ○ US Postal Service Priority | ○ UPS Next Day Air | ○ UPS 2nd Day Air | ○ US Postal Service Bookrate |
| APO/FPO /US Territories | ○ US Postal Service Priority | | ○ US Postal Service Bookrate | |

Type of account to establish?

... ○ Business - <deleted information> ← 222

... ⦿ Credit Card - YOU - <deleted information> ← 224

Credit Card:

| | | |
|---|---|---|
| ⦿ Visa | ○ | ← 226 |
| Card Number | [ ] | ← 228 |
| Expiration | [ ] | ← 230 |
| Name on card | [ ] | ← 232 |
| Issuing bank | [ ] | ← 234 |

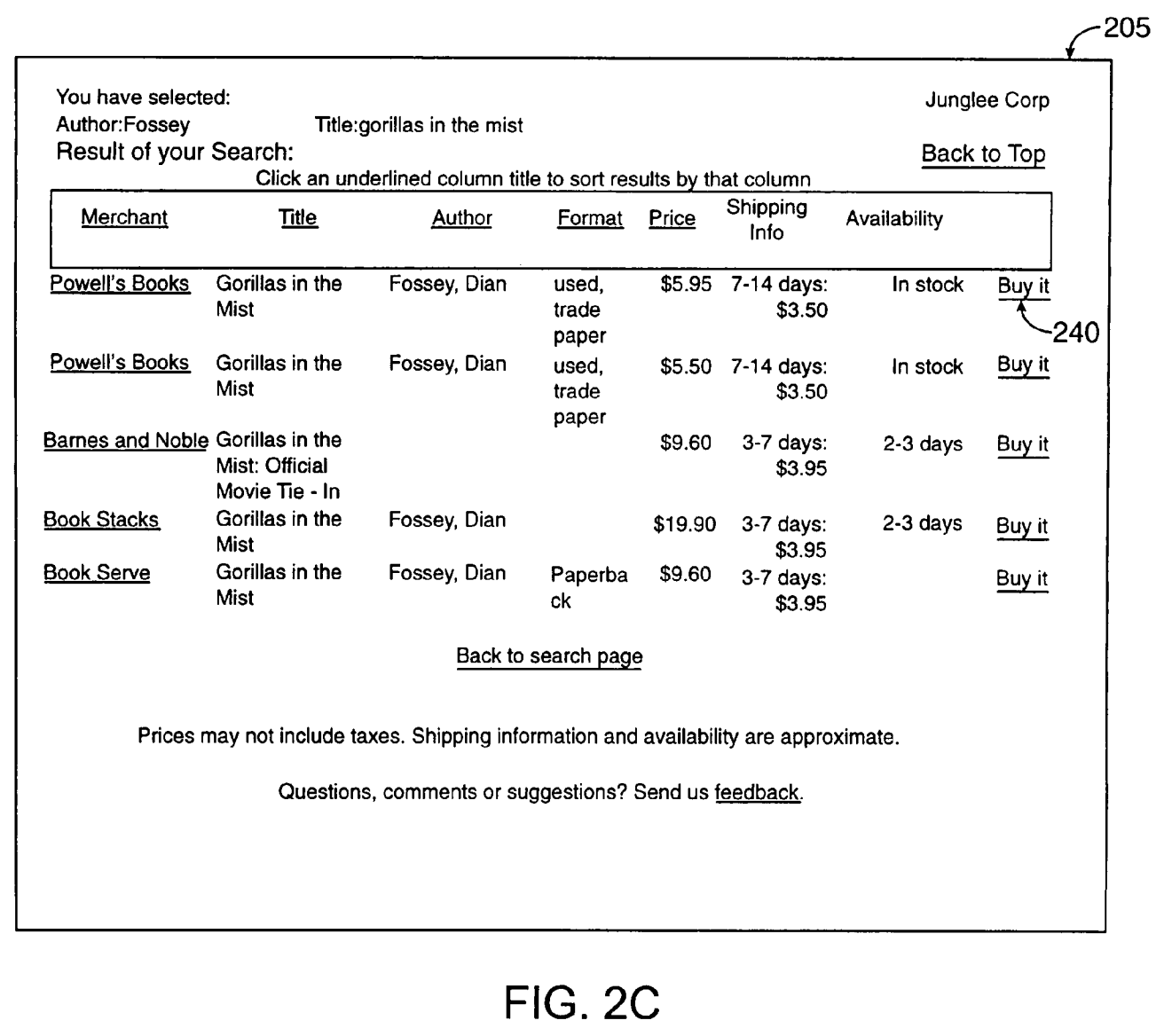

You have selected:

Author:Fossey Title:gorillas in the mist

Result of your Search:

Junglee Corp

Back to Top

Click an underlined column title to sort results by that column

| Merchant | Title | Author | Format | Price | Shipping Info | Availability | |
|---|---|---|---|---|---|---|---|
| Powell's Books | Gorillas in the Mist | Fossey, Dian | used, trade paper | $5.95 | 7-14 days: $3.50 | In stock | Buy it |
| Powell's Books | Gorillas in the Mist | Fossey, Dian | used, trade paper | $5.50 | 7-14 days: $3.50 | In stock | Buy it |
| Barnes and Noble | Gorillas in the Mist: Official Movie Tie - In | | | $9.60 | 3-7 days: $3.95 | 2-3 days | Buy it |
| Book Stacks | Gorillas in the Mist | Fossey, Dian | | $19.90 | 3-7 days: $3.95 | 2-3 days | Buy it |
| Book Serve | Gorillas in the Mist | Fossey, Dian | Paperba ck | $9.60 | 3-7 days: $3.95 | | Buy it |

240

Back to search page

Prices may not include taxes. Shipping information and availability are approximate.

Questions, comments or suggestions? Send us feedback.

FIG. 2C

You have selected: Junglee Corp

Author:Fossey Title:gorillas in the mist

Result of your Search: Back to Top

Click an underlined column title to sort results by that column

| Merchant | Title | Author | Format | Price | Shipping Info | Availability | |
|---|---|---|---|---|---|---|---|
| Powell's Books | Gorillas in the Mist | Fossey, Dian | used, trade paper | $5.95 | 7-14 days: $3.50 | In stock | Add to Cart |
| Powell's Books | Gorillas in the Mist | Fossey, Dian | used, trade paper | $5.50 | 7-14 days: $3.50 | In stock | Add to Cart |
| Barnes and Noble | Gorillas in the Mist: Official Movie Tie - In | | | $9.60 | 3-7 days: $3.95 | 2-3 days | Add to Cart |
| Book Stacks | Gorillas in the Mist | Fossey, Dian | | $19.90 | 3-7 days: $3.95 | 2-3 days | Add to Cart |
| Book Serve | Gorillas in the Mist | Fossey, Dian | Paperback | $9.60 | 3-7 days: $3.95 | | Add to Cart |

Back to search page

Prices may not include taxes. Shipping information and availability are approximate.

METHOD AND SYSTEM FOR INTEGRATING TRANSACTION MECHANISMS OVER MULTIPLE INTERNET SITES

RELATED APPLICATIONS

This application is a continuation of U.S. application Ser. No. 10/602,479, filed Jun. 23, 2003, now U.S. Pat. No. 6,882, 981 which is a division of U.S. application Ser. No. 09/066, 739, filed Mar. 20, 1998 (now U.S. Pat. No. 6,643,624), which claims priority to the following U.S. provisional applications 60/077,322, filed Mar. 9, 1998, and 60/077,655, filed Mar. 11, 1998. The disclosures of the aforesaid applications are hereby incorporated by reference herein.

The disclosures of the following U.S. patents are additionally hereby incorporated by reference herein: U.S. Pat. No. 6,199,079, titled "Method and system for automatically filling forms in an integrated network based transaction environment," U.S. Pat. No. 5,826,258, titled "Method and apparatus for structuring the querying and interpretation of semistructured information," and U.S. Pat. No. 5,963,949, titled "Method for data gathering around forms and search barriers."

BACKGROUND OF THE INVENTION

This invention relates to the area of internet based commerce. Specifically, this invention enables a method and system for interacting with multiple web sites in order to effect commercial transactions on the web.

The process of interacting with the web through a browser may be broadly conceptualized as two types of interactions. The first kind of interaction is based on a user finding information and collating it without subsequent interaction with the provider of the information. This is similar to reading a magazine or researching a library. The second kind of interaction is based upon a user requesting goods or services from the provider' of the information on the web. Electronic commerce is based upon the confluence of both these activities.

From a user's perspective, the web is useful largely because of the ease at which it makes information available and the diversity of information it provides. Problems arise when the information is scattered in many places and not readily accessible or not easily searchable. The following issues impede the efficient use of data by users of the world wide web: (a) different data representations, (b) different vocabularies, (c) different levels of functionality, (d) multiple locations, and (e) absence from the web.

U.S. Pat. No. 5,826,258 discloses Virtual Database Management System ("VDBMS") technology in which structure is added to semi-structured data, thereby making the data searchable using known techniques. VDBMS technology enables data from multiple sites to be integrated together and made searchable via a common mechanism. This technology is applicable to non-web sources such as legacy data sources in Relational Database Management Systems ("RDBMS"), text files, feeds in systems like SII, word and other text processor documents, UNIX file systems, and so forth. The technology's broad applicability in integrating a multiplicity of sources has been proven in the market in publicly available services.

The flow of information from the user to providers of data is as important as the flow of information from providers to the user. The bidirectional exchange of data forms the basis of commerce in traditional media and online. For example, a purchase involves information flow from the store to the buyer in the display of goods available, and from the buyer to the store in the transmission of payment information to complete a transaction.

Currently, internet purchasers must visit multiple web sites in order to consummate a transaction. For example, a user desiring to purchase a book entitled "World Peace," and a CD-ROM entitled "Unplugged," desires to make these purchases efficiently and to get the best prices for these items. The user must visit many different vendors to determine who sells the items, select a particular vendor for each item based on separately visiting the vendors, fill in multiple forms for the different vendors, each of which requires the user to enter the same information, and finally track multiple transactions.

Using the search methods described in U.S. patent application Ser. No. 08/724,923, the user can find the best price for any item available from many vendors. The user is able to seamlessly query multiple different vendor data to make a decision, simplifying the decision process. However, purchasing the items still requires that the user interact with multiple web site "shopping carts," and fill in the required information multiple times. For example, the user typically must give her name, address, and credit card number, and must click the "Buy it" button and deal with order entry forms, for each of the vendors.

What is needed is a method to allow a user to search for items coming from different vendors Web sites by comparing them on multiple attributes and then to purchase these items without having to browse and interact with different sites.

SUMMARY OF THE INVENTION

According to one embodiment of the invention, a method is provided for effecting transactions across multiple vendors in an integrated environment, wherein the user may purchase each of a plurality of items the user finds independent of the vendors. The user's selections are received from the user and mapped to a selected set of vendors. When the user is finished, she invokes a check-out application to automatically fill in one or many order entry forms for each of the relevant vendors whose goods the user selected during the course of shopping. The check-out application uses common information, such as name, address and credit card number, previously provided by the user in order to fill in the order entry forms for each vendor without requiring the user to fill in these forms. Finally, the check-out application tracks confirmation numbers in a common information store.

The above approach has many advantages: A key advantage of systems according to the present invention is that the user does not have to fill in multiple forms in order to effect internet transactions.

A further advantage of the present invention is that the user does not have to interact with multiple dissimilar interfaces.

A yet further advantage of the present invention is that the user can shop across multiple vendors without repeatedly entering purchase information.

The invention will be better understood with reference to the following detailed description and its accompanying drawings.

BRIEF DESCRIPTION OF THE DRAWINGS

FIGS. 2A-2D depict representative forms in accordance with a particular embodiment of the invention;

DETAILED DESCRIPTION OF THE SPECIFIC EMBODIMENTS

1.0 Introduction

The present invention provides a method for interacting with multiple web sites in order to effect commercial transactions on the web. Systems according to the present invention enable online shoppers to make selections and purchase products from a plurality of vendor sources using a common interface program. A particular embodiment according to the invention has been reduced to practice and will be made available under the trade name "AutoScribe™." Table 1 provides a definitional list of certain terms used herein:

TABLE 1

| | |
|---|---|
| Attribute | A blank space in a form, used to hold information, such as mailing address. |
| Property | A piece of user meta data |
| Transformation Function | A function which when applied to user meta data yields a value to fill into an attribute in a form |

1.1 Hardware Overview

Figure 1A:
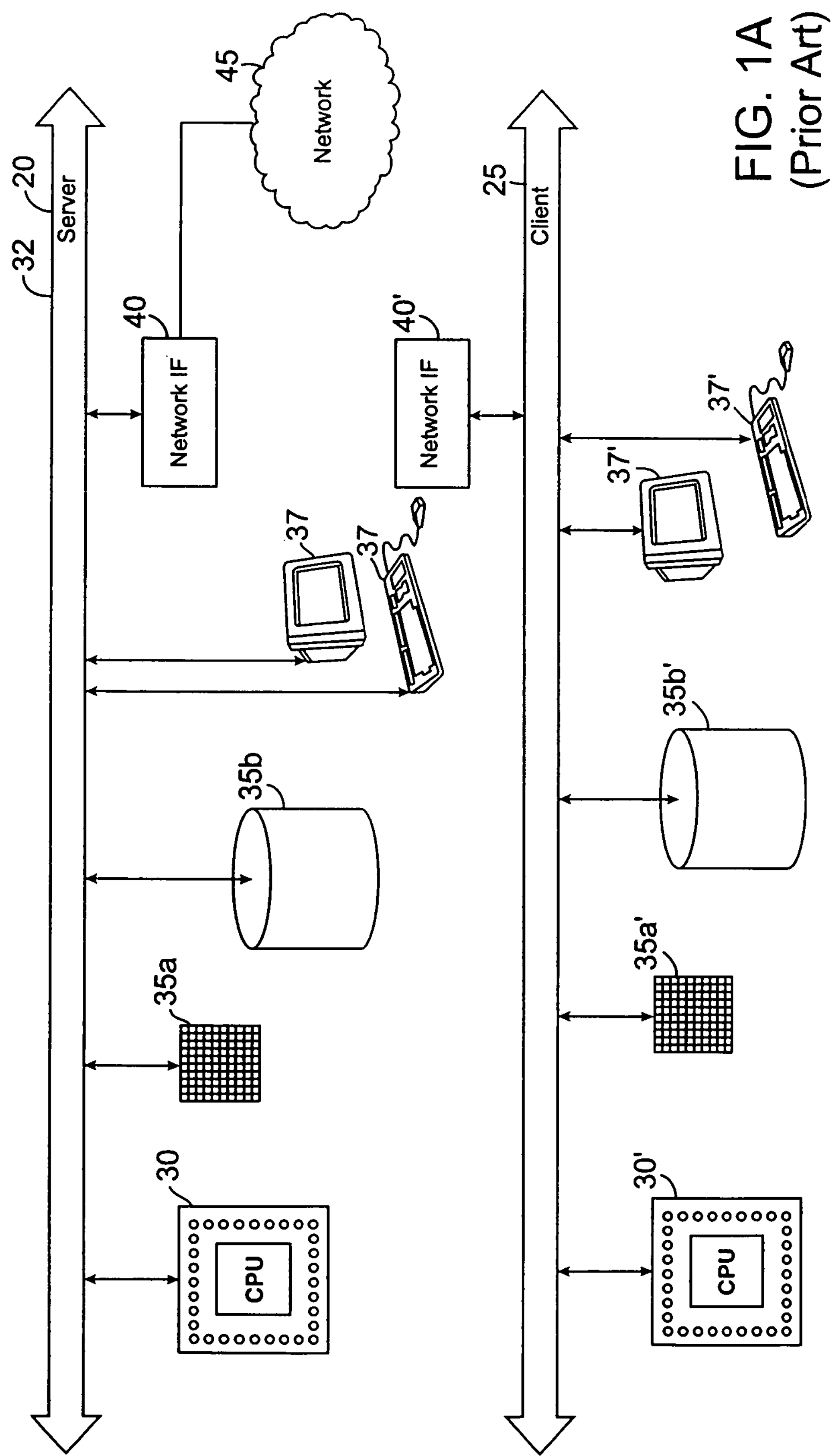
FIG. 1A depicts a representative client server relationship in accordance with a particular embodiment of the invention.

The method for interacting with multiple web sites in order to effect commercial transactions on the web is implemented in the Perl and Java programming languages and is operational on a computer system such as shown in FIG. 1A. This invention may be implemented in a client-server environment, but a client-server environment is not essential. FIG. 1A shows a conventional client-server computer system which includes a server 20 and numerous clients, one of which is shown as client 25. The use of the term "server" is used in the context of the invention, wherein the server receives queries from (typically remote) clients, does substantially all the processing necessary to formulate responses to the queries, and provides these responses to the clients. However, server 20 may itself act in the capacity of a client when it accesses remote databases located at another node acting as a database server.

The hardware configurations are in general standard and will be described only briefly. In accordance with known practice, server 20 includes one or more processors 30 which communicate with a number of peripheral devices via a bus subsystem 32. These peripheral devices typically include a storage subsystem 35, comprised of memory subsystem 35*a* and file storage subsystem 35*b*, which hold computer programs (e.g., code or instructions) and data, a set of user interface input and output devices 37, and an interface to outside networks, which may employ Ethernet, Token Ring, ATM, IEEE 802.3, ITU X.25, Serial Link Internet Protocol (SLIP) or the public switched telephone network. This interface is shown schematically as a "Network Interface" block 40. It is coupled to corresponding interface devices in client computers via a network connection 45.

Client 25 has the same general configuration, although typically with less storage and processing capability. Thus, while the client computer could be a terminal or a low-end personal computer, the server computer is generally a high-end workstation or mainframe, such as a SUN SPARC™ server. Corresponding elements and subsystems in the client computer are shown with corresponding, but primed, reference numerals.

The user interface input devices typically include a keyboard and may further include a pointing device and a scanner. The pointing device may be an indirect pointing device such as a mouse, trackball, touchpad, or graphics tablet, or a direct pointing device such as a touchscreen incorporated into the display. Other types of user interface input devices, such as voice recognition systems, are also possible.

The user interface output devices typically include a printer and a display subsystem, which includes a display controller and a display device coupled to the controller. The display device may be a cathode ray tube (CRT), a flat-panel device such as a liquid crystal display (LCD), or a projection device. Display controller provides control signals to the display device and normally includes a display memory for storing the pixels that appear on the display device. The display subsystem may also provide a non-visual display such as audio output.

The memory subsystem typically includes a number of memories including a main random access memory (RAM) for storage of instructions and data during program execution and a read only memory (ROM) in which fixed instructions are stored. In the case of Macintosh-compatible personal computers the ROM would include portions of the operating system; in the case of IBM-compatible personal computers, this would include the BIOS (basic input/output system).

The file storage subsystem provides persistent (non-volatile) storage for program and data files, and typically includes at least one hard disk drive and at least one floppy disk drive (with associated removable media). There may also be other devices such as a CD-ROM drive and optical drives (all with their associate removable media). Additionally, the computer system may include drives of the type with removable media cartridges. The removable media cartridges may, for example be hard disk cartridges, such as those marketed by Syquest and others, and flexible disk cartridges, such as those marketed by Iomega. One or more of the drives may be located at a remote location, such as in a server on a local area network or at a site of the Internet's World Wide Web.

In this context, the term "bus subsystem" is used generically so as to include any mechanism for letting the various components and subsystems communicate with each other as intended. With the exception of the input devices and the display, the other components need not be at the same physical location. Thus, for example, portions of the file storage system could be connected via various local-area or wide-area network media, including telephone lines. Similarly, the input devices and display need not be at the same location as the processor, although it is anticipated that the present invention will most often be implemented in the context of PCs and workstations.

Bus subsystem 32 is shown schematically as a single bus, but a typical system has a number of buses such as a local bus and one or more expansion buses (e.g., ADB, SCSI, ISA, EISA, MCA, NuBus, or PCI), as well as serial and parallel ports. Network connections are usually established through a device such as a network adapter on one of these expansion buses or a modem on a serial port. The client computer may be a desktop system or a portable system.

The user interacts with the system using interface devices 37' (or devices 37 in a standalone system). For example, client queries are entered via a keyboard, communicated to client processor 30', and thence to network interface 40' over bus subsystem 32'. The query is then communicated to server 20 via network connection 45. Similarly, results of the query are communicated from the server to the client via network connection 45 for output on one of devices 37' (say a display or a printer), or may be stored on storage subsystem 35'.

1.2 Software Architecture

Figure 1B:
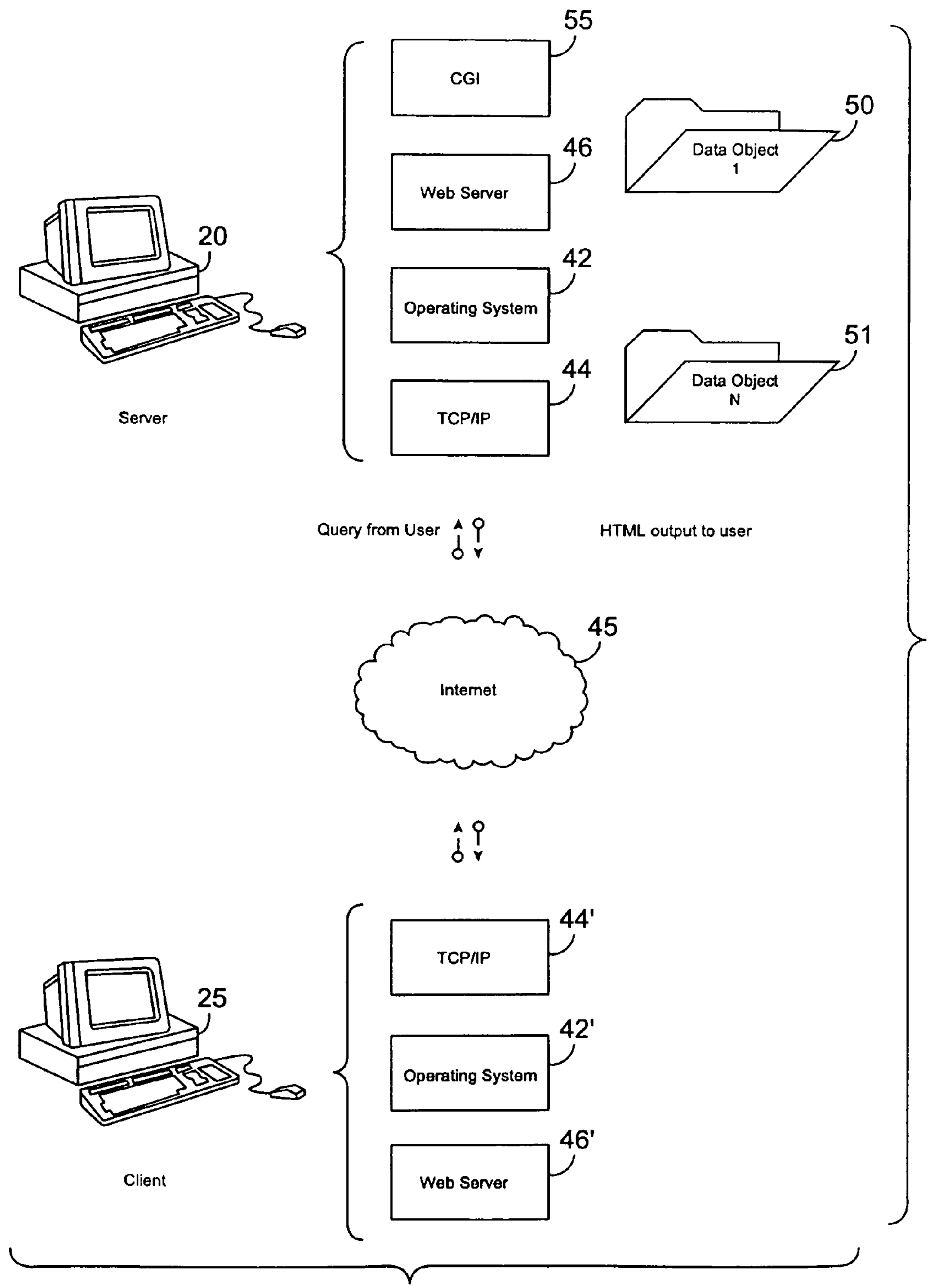
FIG. 1B depicts a functional perspective of the representative client server relationship in accordance with a particular embodiment of the invention.

FIG. 1B is a functional diagram of the computer system of FIG. 1A. FIG. 1B depicts a server 20, and a representative client 25 of a multiplicity of clients which may interact with the server 20 via the internet 45 or any other communications method. Blocks to the right of the server are indicative of the processing components and functions which occur in the server's program and data storage indicated by block 35*a* in FIG. 1A. A TCP/IP "stack" 44 works in conjunction with Operating System 42 to communicate with processes over a network or serial connection attaching Server 20 to internet 45. Web server software 46 executes concurrently and cooperatively with other processes in server 20 to make data objects 50 and 51 available to requesting clients. A Common Gateway Interface (CGI) script 55 enables information from user clients to be acted upon by web server 46, or other processes within server 20. Responses to client queries may be returned to the clients in the form of a Hypertext Markup Language (HTML) document outputs which are then communicated via internet 45 back to the user.

Client 25 in FIG. 1B possesses software implementing functional processes operatively disposed in its program and data storage as indicated by block 35*a'* in FIG. 1A. TCP/IP stack 44' works in conjunction with Operating System 42' to communicate with processes over a network or serial connection attaching Client 25 to internet 45. Software implementing the function of a web browser 46' executes concurrently and cooperatively with other processes in client 25 to make requests of server 20 for data objects 50 and 51. The user of the client may interact via the web browser 46' to make such queries of the server 20 via internet 45 and to view responses from the server 20 via internet 45 on the web browser 46'.

Figure 1C:
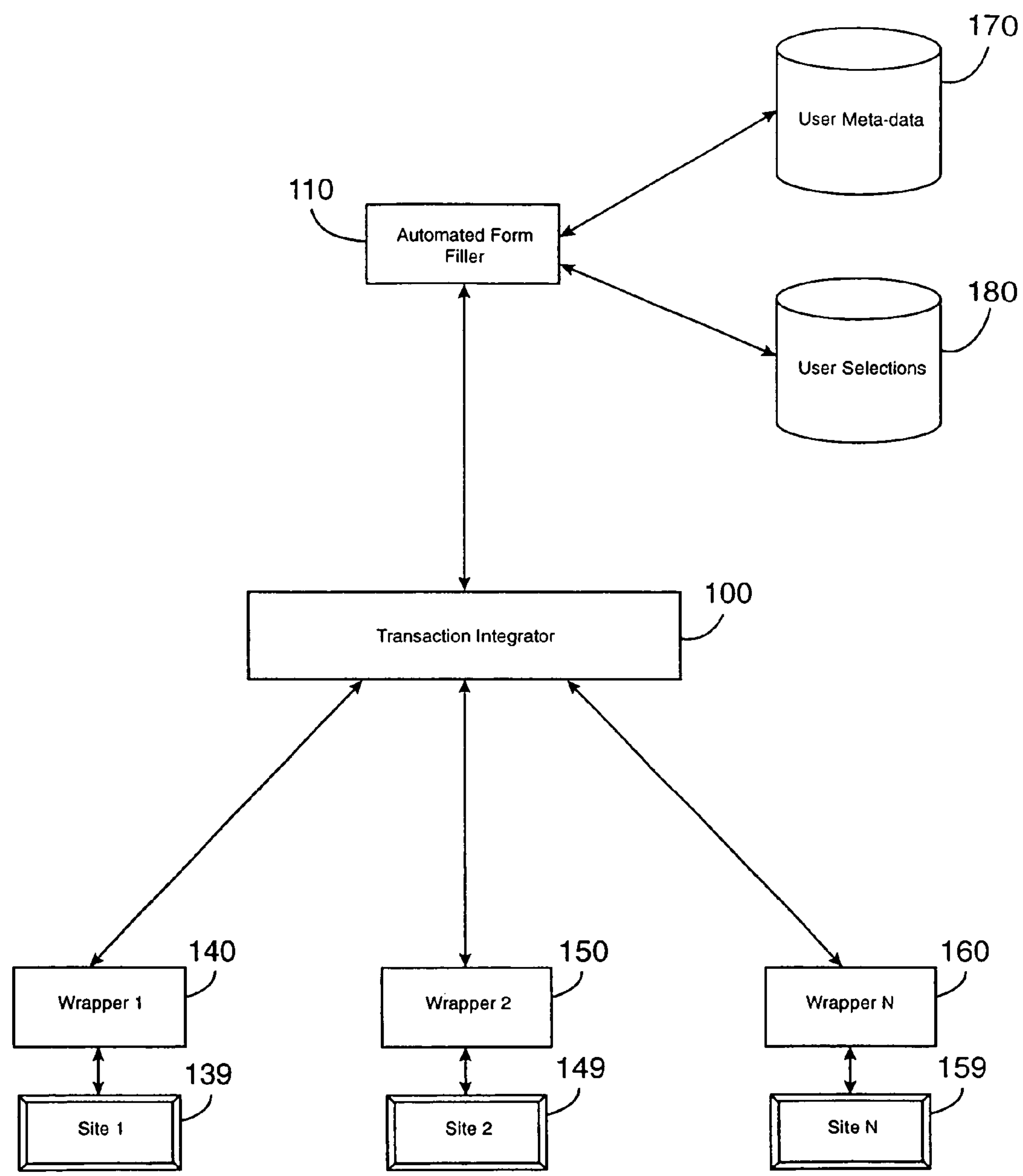
FIG. 1C depicts a functional perspective of the components of a particular embodiment of the invention.

FIG. 1C depicts a functional perspective of the software components resident in storage subsystem 35' of client 25 or storage subsystem 35 of server 20, which cooperatively perform automated transaction processing in accordance with a particular embodiment of the invention. Transaction integrator 100 performs processing of information in conjunction with one or more wrapper programs 140, 150 and 160 configured to specific merchandising sites 139, 149 and 159. Automated form filling component 110 interacts with User Meta-database 170 and User Selection database 180 in order to perform the filling in of online forms presented by various shopping sites. Transaction integrator 100 controls responding to the user's requests to search for various merchandise, obtaining information from the user about the user's merchandise selections from the search results and building information into the User Meta-database 170 and the User Selection database 180.

Figure 1D:
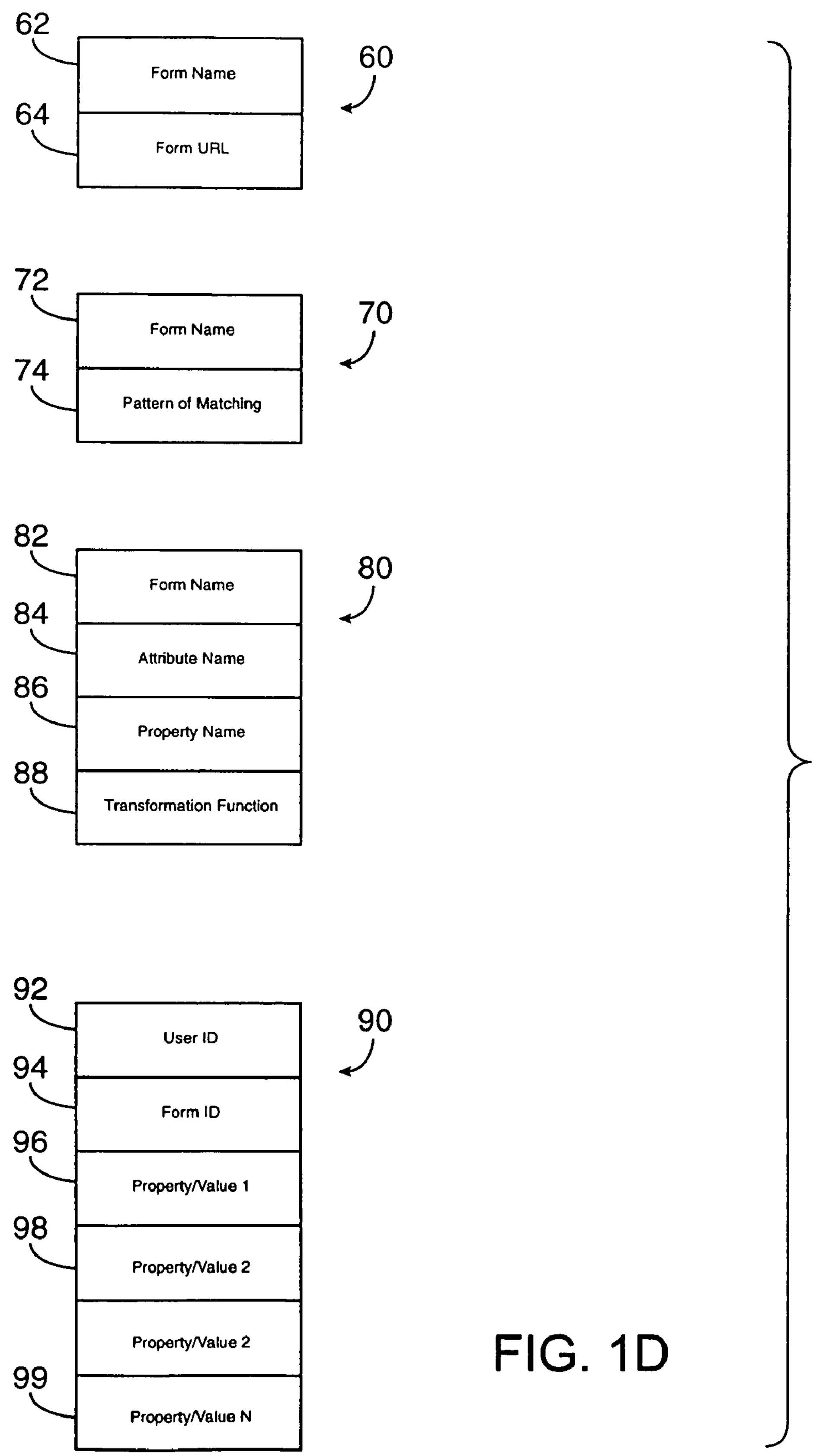
FIG. 1D depicts a plurality of relationships among data in accordance with a particular embodiment of the invention.

FIG. 1D depicts a plurality of relationships between data objects in the User Meta-database 170. Relationship 60 associates a form finding criterion, here a form URL 64, with a form identifier, here a form name 62. Relationship 70 associates a pattern for matching 74 with a form name 72. Relationship 80 associates a form name 82 with a property name 86, an attribute name 84 and a transform function 88. Attribute 84 is a field in a form which we would like to fill in automatically, for example a space for the user's name. Property 86 is a piece of user meta data, stored in User Meta-database 170, for example, a name of a user. Transformation function 88 converts a property into a value for filling in a field in a form. For example, consider a form that has an attribute called "name" which is of a type "last name, first name." Further, consider user meta data that is unique to each user comprising a first property, "first-name," and a second property, "last-name." A value to fill into the form for the "name" attribute is obtained by concatenating the property "last-name," followed by a "comma," followed by the property "first-name." The concatenation process is a transformation function. Using this technique, the same user meta data may be specified in different ways by different forms. Applying these techniques provides the ability to specify how to modify properties, or meta data, to fill in a wide variety of forms. Finally, relationship 90 associates a User ID 92 with a form ID 94, and a plurality of property-value tuples 96, 98 and 99.

2.0 On-Line Transactions Forms

FIGS. 2A and 2B depict representative forms for transactions with online merchants. The usual method of consummating a purchase order is for the user to fill in the fields in a series of forms with the required information and click a "submit" button to complete the purchase. FIG. 2A depicts a registration form 201, having a plurality of fields in which the user enters information. The user must enter her name in a name field 202, her mailing information in address fields 204, 206, 208, 210 and 212, her telephone number in a telephone number field 214, then click a "done" button 216 to submit form 201 to the server 20. FIG. 2B depicts a shipping and account information form 203, having a plurality of fields in which the user must enter information. The user enters her desired method of shipment by selecting the corresponding button in shipment box 220. Next, she indicates the type of account she wishes to establish using buttons 222 and 224. Then, she enters her payment information in credit card type button 226, card number field 228, expiration field 230, name field 232 and issuing bank field 234. Thus, it is not one form that is filled in, but a series of forms.

3.0 Automating On-Line Transactions 3.1 Automating a Single On-Line Transaction

Figure 3A:
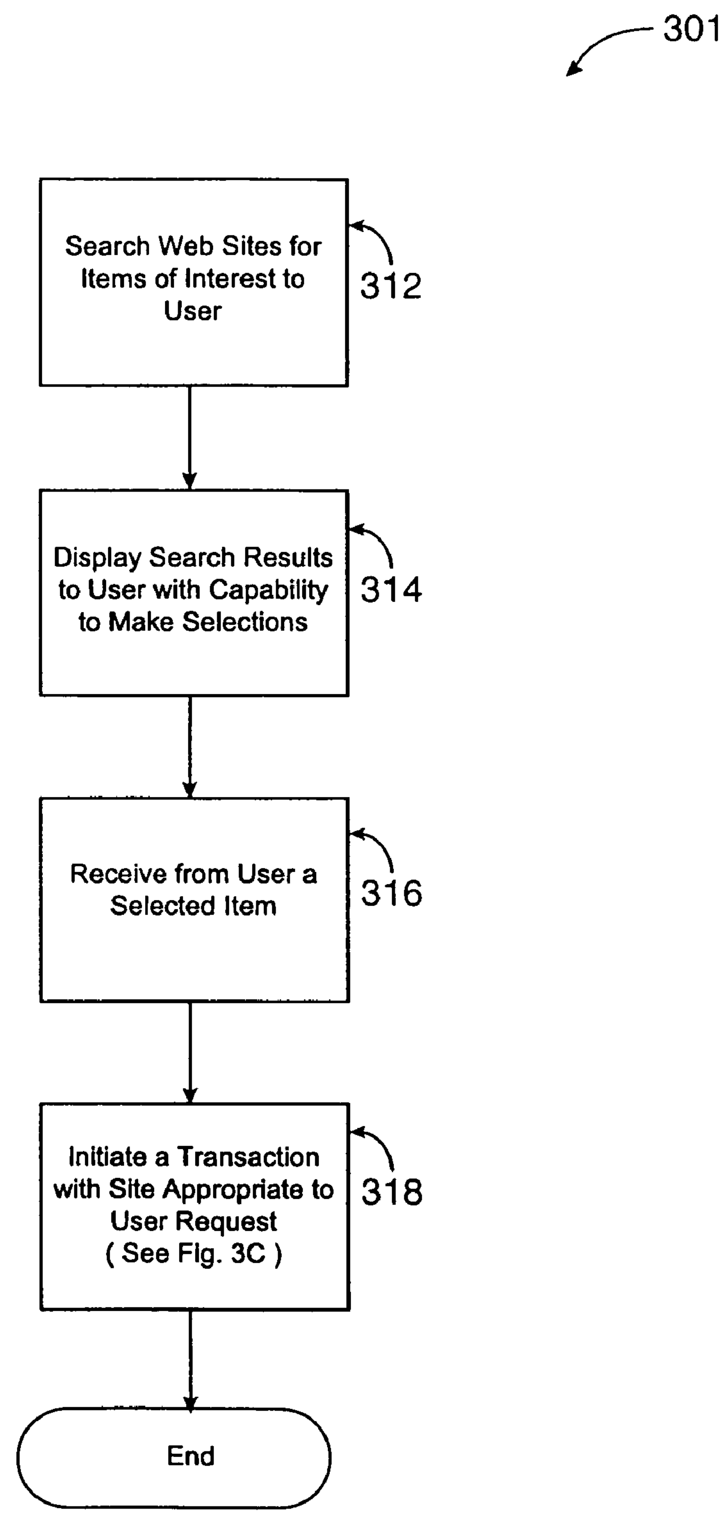
FIGS. 3A-3D depict flowcharts of processing in accordance with a particular embodiment of the invention.

FIG. 3A depicts a flowchart 301 of the process steps in executing an automated transaction. In a step 312, the user performs a search for items of interest using a search program as is known in the art. Then, in a step 314, a result page depicting the results of the search performed in step 312, such as result page 205 of FIG. 2C, is displayed to the user. Next, in a step 316, the user makes a selection of an item from the result page using a mouse, or other method. Next, in a step 318, a transaction is initiated with a site corresponding to a vendor offering the merchandise selected by the user. For example, in the sample result page 205, when a user clicks a "Buy it" link 240, a request to buy the selected product is initiated at the site of the vendor corresponding to the item selected by the user. Processing for this step is depicted in greater detail in a flowchart 305 in FIG. 3C.

3.2 Transactions with Multiple On-Line Vendors

Figure 3B:
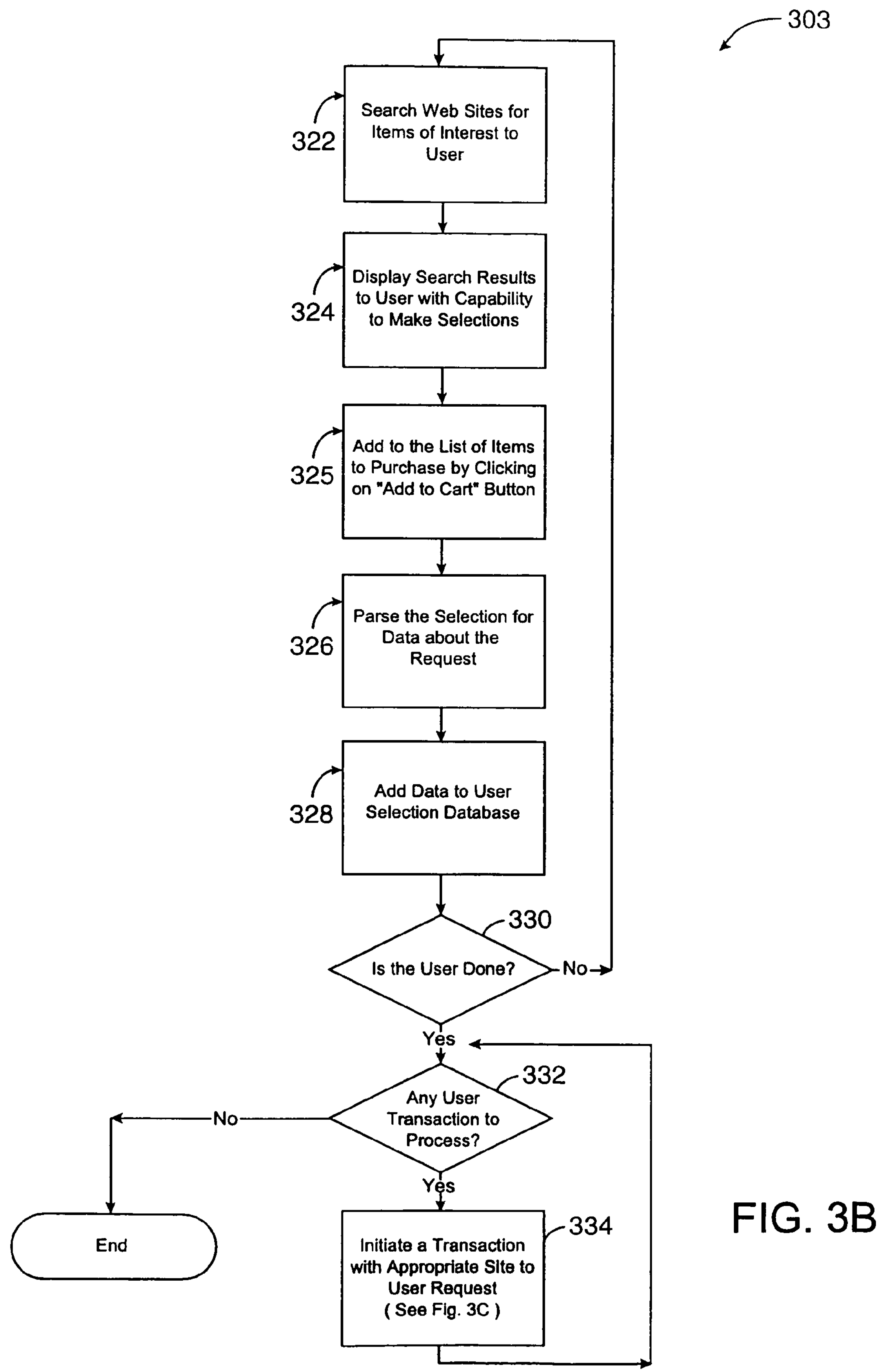

Multiple purchases across different vendors are integrated based upon the concept of a "virtual check-out counter," from which all transactions are consummated. The virtual check-out counter enables the user to make payments at a single point even though returns and product question transactions are handled by individual vendor sites. FIG. 3B depicts a flowchart 303 of steps in virtual check-out counter processing. In a step 322, the user performs a search for items of interest using a search program as is known in the art. Then, in a step 324, a result page depicting the results of the search performed in step 322, such as result page 206 of FIG. 2D, is displayed to the user. Next, in a step 325, the user's selection of an item from the result page 206 by using a mouse to click an "Add it" icon 242, or other method, is added to a list of items to purchase.

Figure 3C:
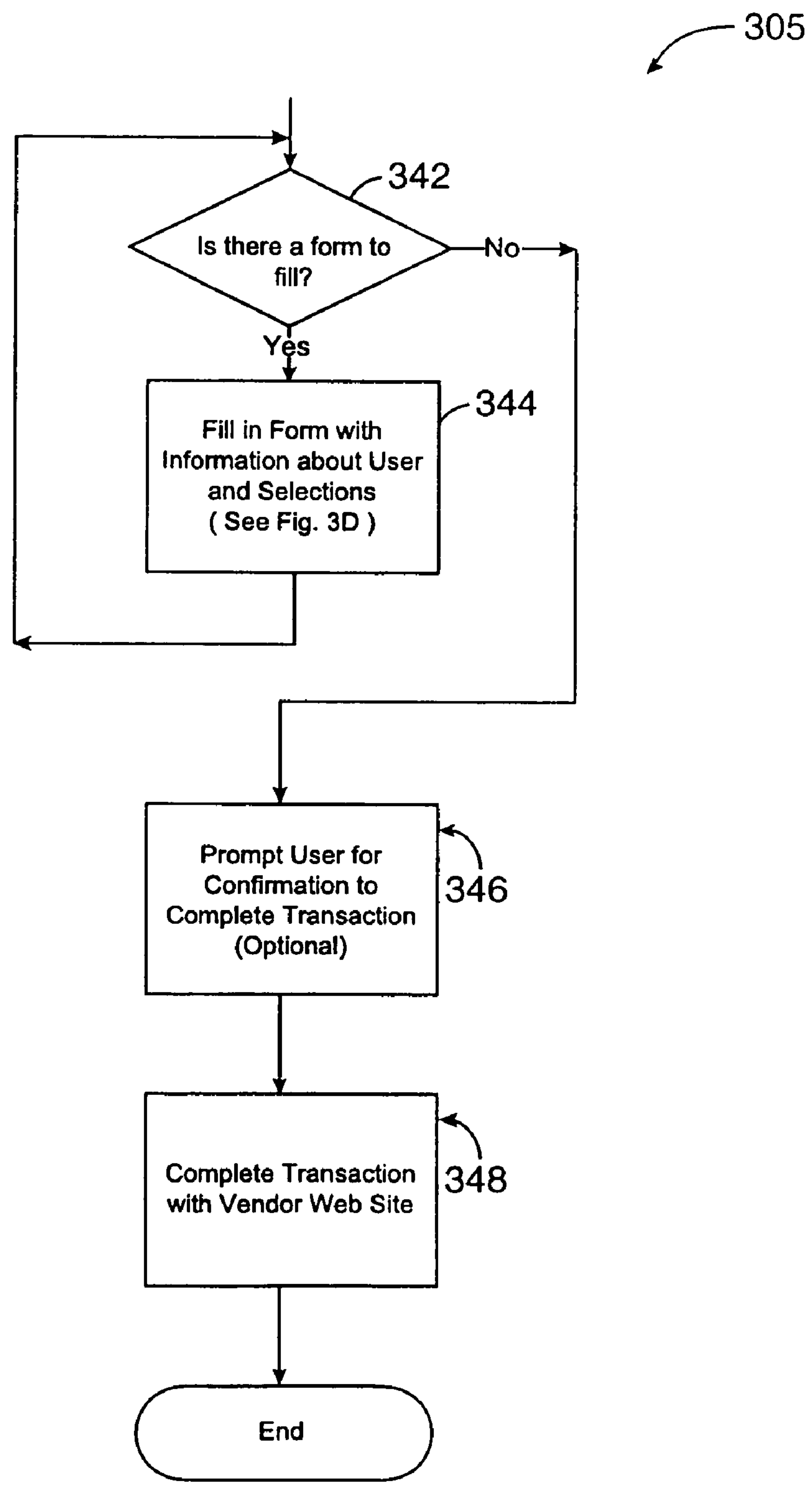

Then, in a step 326, the list is parsed for selection data. Next, in a step 328, selection data for the purchase request is stored into the User Selection database 180. Next, in a decisional step 330, a determination is made whether the user has finished making selections. If the user makes further selections, the processing depicted by steps 322-330 of flowchart 303 is performed for each selection made by the user. Otherwise, responsive to the user's request to "check out," in a decisional step 332, a determination is made if any selections made by the user require transaction processing. In a step 334, transaction processing is performed for each selection made by the user in steps 322-330 of flowchart 303. Flowchart 305 of FIG. 3C depicts the transaction processing of step 334 in greater detail. Otherwise, when no further user selections remain, processing returns.

3.3 Automating Transaction Form Filling

FIG. 3C depicts a flowchart 305 depicting the processing for completing a transaction with a vendor on behalf of a user. In a decisional step 342, a determination is made whether there are any remaining forms which must be filled in to complete the transaction. If a form must be filled in, then in a step 344, the form is filled in by processing detailed in FIG. 3D. Next, processing returns to decisional step 342. When decisional step 342 determines that no further forms remain, all forms required by the vendor site have been filled in. Processing then continues with an optional step 346, which displays a screen to prompt the user to confirm the purchase. Finally, in a step 348, the transaction with the vendor site is completed and confirmation information returned by the vendor is stored for subsequent tracking.

3.4 Automated Order Form Filling

Figure 3D:
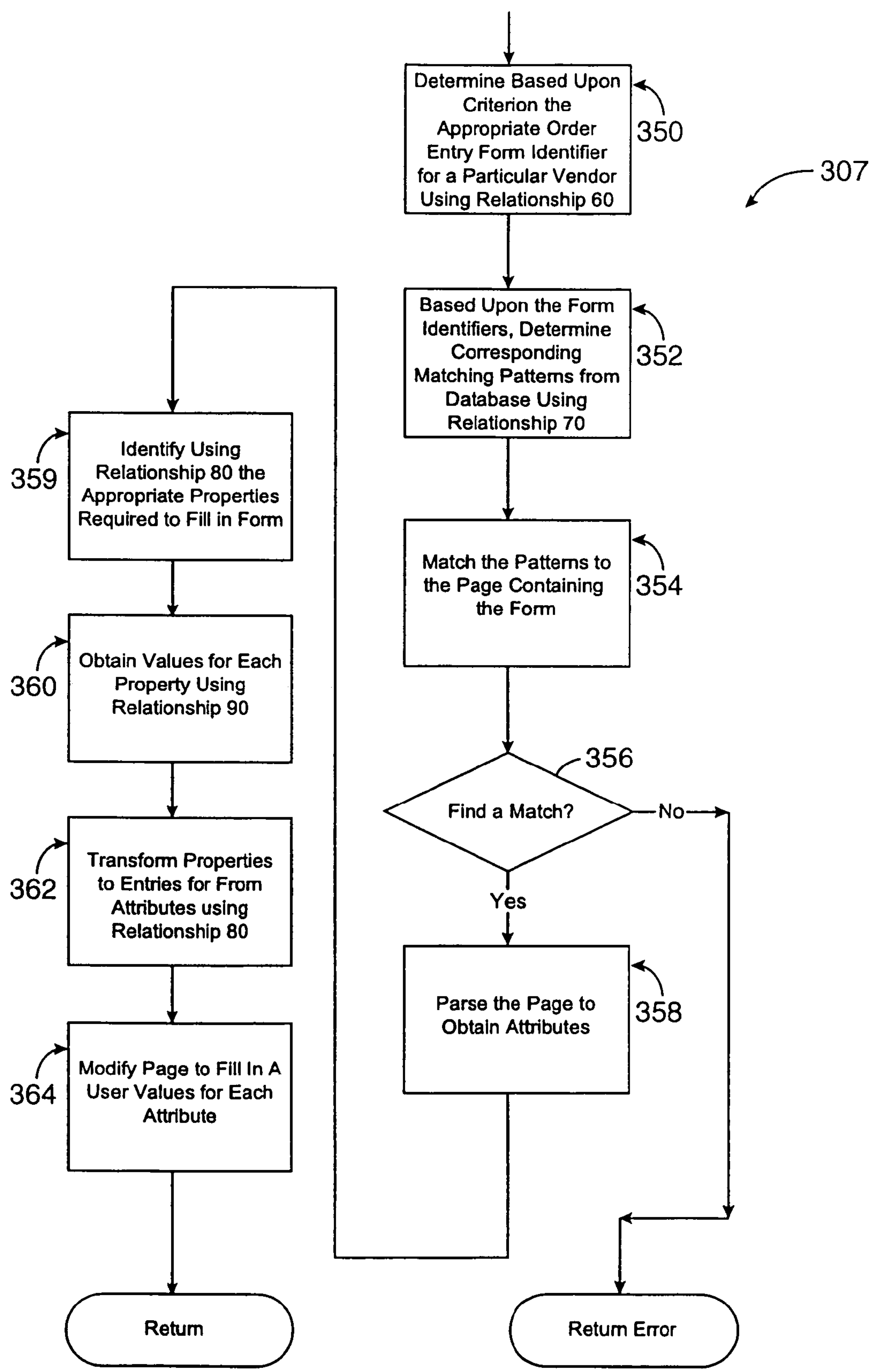

Forms associated with a vendor's site corresponding to product selections made by a user are automatically filled in with the information stored in User Meta-database 170 and User Selection database 180, such as the name, credit card number, and address of a user, using relationships 60, 70, 80 and 90 depicted in FIG. 1D. FIG. 3D depicts a flowchart 307 of the process steps for automated form filing according to a particular embodiment of the invention. In a step 350, the appropriate form identifier for a particular vendor is determined based upon a selectable criterion using relationship 60. Relationship 60 associates the criterion of form URL 64 with a form identifier, form name 62. Next, in a step 352, the form identifier determined in step 350 is used to determine one or more corresponding matching patterns using relationship 70. Relationship 70 associates form identifier form name 72, which will be the form identifier determined in step 350, with pattern 74.

Next, in a step 354, pattern 74 is matched against a web page containing a form of interest which is to be filled in. In a decisional step 356, if no match is found with the pattern 74, then an error condition is returned, so that a system administrator can be made aware that there is a form for which no matching pattern exists. Otherwise, in a step 358, the page is parsed in order to obtain a plurality of attributes. Then, in a step 359, properties are identified using relationship 80 to identify those required to fill in the target form. In a step 360, a value is obtained for each property using relationship 90 by matching the form identifier to a form name 94 and reading property-value pairs 96, 98 and 99.

Next, in a step 362, the properties determined in step 359 are transformed using relationship 80 to yield values for each attribute in the target form by applying transformation function 88 corresponding to property name 86 matching the property of interest in relationship 80 for the particular form identifier form name 82. The result is used to fill in the attribute corresponding to attribute name 84. Finally, in a step 364, the target form is filled in with property values obtained in step 362. Then processing returns.

3.4.1 Submitting Forms Using a Wrapper

In an alternative embodiment, the concept of a wrapper, a program which fills in and submits forms in order to accumulate information from web sites, may be used to complete a purchase transaction. The data to be filled into each form is obtained from the User Meta-database 170 and User Selection database 180. Wrapper programs are described in detail in co-owned U.S. Pat. No. 5,826,258.

According to this embodiment, a wrapper program is constructed for each vendor to capture the logic for the forms that need to be filled to consummate a purchase. A second wrapper program is constructed for each site to perform information-gathering. The transaction-wrapper exercises different parts and different functionality of the site than the information-gathering wrapper. Any site can have multiple wrappers built for it, each of which gets different information or performs a different function. Constructing wrappers which fill in and submit forms is described in greater detail in co-owned U.S. Pat. No. 5,963,949.

According to this embodiment, the user's clicking the "Buy it" link causes the execution of the transaction-wrapper that fills the correct forms in the correct order, ultimately bringing the user to the point where the user can confirm the transaction. All intermediate steps of filling forms with user-specific information are performed by the wrapper.

3.4.2 Applications in Select Embodiments

In a particular embodiment, the automated form filling technology may be used in a proxy server to intercept incoming pages. In an alternative embodiment, the automated form filling technology may be used in a browser program to screen pages before display to the user.

4.0 Conclusion

In conclusion, the present invention provides for a method of conducting transactions with multiple vendor sites using a common interface. An advantage of the present invention is that there is a single point of user profile information for submission. A further advantage of the present invention is that it enables the user to buy a collection of items by a given date at the minimum cost, including tax and shipping charges. A yet further advantage of the present invention is that it employs a single point to check out instead of multiple points, thus saving time and money for everyone concerned.

Other embodiments of the present invention and its individual components will become readily apparent to those skilled in the art from the foregoing detailed description. As will be realized, the invention is capable of other and different embodiments, and its several details are capable of modifications in various obvious respects, all without departing from the spirit and the scope of the present invention. Accordingly, the drawings and detailed description are to be regarded as illustrative in nature and not as restrictive. It is therefore not intended that the invention be limited except as indicated by the appended claims.

What is claimed is:

1. A computer-implemented method of facilitating transactions on web sites, the method comprising:

one or more computer systems configured to execute instructions comprising:

receiving, and storing in a data repository, user information supplied by a user, including information suitable for conducting transactions via web sites;

programmatically obtaining, from a web site, information about an item that can be ordered via the web site;

presenting the obtained information to the user separately from the web site, in conjunction with functionality for the user to select the item for placement of an order; and in response to a request from the user to order the item, automatically filling in a sequence of two or more web forms of the web site with user information obtained from the data repository, and automatically submitting the web forms, to at least partially automate a process of placing an order for the item, wherein the web forms are filled in and submitted using automated form filling technology that fills in the sequence of two or more web forms in a correct order without the web forms being presented to the user and without obtaining additional user information directly from the user when filling out the web forms.

2. The method of claim 1, wherein the obtained information is presenting to the user on a web page that is separate from the web site, said web page providing said functionality for the user to select the hem for placement of an order.

3. The method of claim 1, wherein the sequence of two or more web forms is filled in by a proxy server that intercepts incoming web pages.

4. The method of claim 1, wherein the method is performed without the user accessing the web site.

5. The method of claim 1, wherein the method comprises intercepting incoming web pages of the web site and preventing such incoming web pages from being presented to the user.

6. The method of claim 1, wherein the method comprises inhibiting the sequence of two or more web forms from being presented to the user.

7. The method of claim 1, wherein the method comprises, in response to the request from the user to order the item, automatically placing an order for the item on behalf of the user.

8. The method of claim 7, further comprising programmatically receiving, and storing in a data repository, order confirmation information provided by the web site in response to placement of the order.

9. The method of claim 1, wherein automatically filling in the sequence of two or more web forms comprises programmatically converting a portion of the user information into a format that complies with the web forms.

10. The method of claim 9, wherein programmatically converting the portion of the user information comprises applying a transformation function to the portion of user information.

11. The method of claim 1, wherein the automated form filling technology comprises using pattern matching to match portions of the user information to corresponding fields of the sequence of two or more web forms.

12. The method of claim 1, wherein the automated form filing technology comprises a transaction wrapper associated with the web site and the sequence of two or more web forms is filled via execution of the transaction wrapper.

13. The method of claim 12, wherein the information about the item is obtained from the web site by execution of an information-gathering wrapper that is separate from the transaction wrapper.

14. The method of claim 1, wherein the request from the user to order the item is a request to order a plurality of items represented in an electronic shopping cart.

15. A computer-implemented method of facilitating transactions on web sites, the method comprising:

one or more computer systems configured to execute instructions comprising:

receiving, and storing in a data repository, user information supplied by a user, said user information including information suitable for conducting transactions via web sites;

maintaining, in an electronic shopping cart associated with the user, a record of a plurality of items selected by the user to order, including at least a first item offered by a first entity on a first web site, and a second item offered by a second entity on a second web site, and in response to a request from the user to order the items recorded in the electronic shopping cart, automatically initiating at least a first transaction to order the first item from the first entity, and a second transaction to order the second item from the second entity, wherein the first and second transactions are initiated, at least in part, by automatically filling in a first sequence of two or more web forms of the first web site with at least some of the user information obtained from the data repository using automated form filling technology that fills in the first sequence of two or more web forms in a correct order without obtaining additional user information directly from the user when filling out the first sequence of web forms, by automatically filling a second sequence of two or more web forms of the second web site with at least some of the user information obtained from the data repository using automated form filling technology that fills in the second sequence of two or more web forms without obtaining additional user information directly from the user when filling out the second sequence of web forms, and by automatically submitting the first and second sequences of web forms on behalf of the user.

16. The method of claim 15, wherein the method is performed such that the user is not exposed to the first and second sequences of web forms.

17. The method of claim 15, wherein the method is performed without the user accessing either the first web site or the second web site.

18. The method of claim 15, wherein the method comprises intercepting incoming web pages of the first and second web sites and preventing such web pages from being presented to the user.

19. The method of claim 15, wherein the first and second sequences of web forms are filled in by a proxy server that intercepts incoming web pages.

20. The method of claim 15, wherein automatically filling in the first sequence of web forms comprises converting a portion of the user information into a format that complies with the first sequence of web forms.

21. The method of claim 15, wherein the automated form filling technology comprises using pattern matching to match portions of the user information to corresponding fields of the first sequence of web forms.

22. The method of claim 15, wherein the automated form filling technology comprises a first wrapper program associated with the first web site and a second wrapper program associated with the second web site, and wherein the first sequence of web forms is filled via execution of the first wrapper program associated with the first web site and the second sequence of web forms is filled via execution of a second wrapper program associated with the second web site.

23. The method of claim 15, wherein the method comprises completing the first and second transactions automatically on behalf of the user without user intervention.

24. The method of claim 15, wherein the method further comprises prompting the user to confirm the first and second transactions.

25. The method of claim 15, further comprising extracting item sales listings from at least the first and second web sites, and aggregating the item sales listings within a single web page that provides functionality for the user to select a listed item to add to the electronic shopping cart.

26. A system for facilitating transactions on web sites, the system comprising:

- a data store that stores user information supplied by a user, including information suitable for conducting transactions via web sites; and
- a computing device in communication with the data store and that is operative to:
  - programmatically obtain, from a web site, information about an item that can be ordered via the web site;
  - present the obtained information to the user separately from the web site, in conjunction with functionality for the user to select the item for placement of an order; and
  - in response to a request from the user to order the item, automatically fill in a sequence of two or more web forms of the web site with user information obtained from the data store, and automatically submit the web forms, to at least partially automate a process of placing an order for the item, wherein the web forms are filled in and submitted using automated form filling technology that fills in the sequence of two or more web forms without the web forms being presented to the user and without obtaining additional user information directly from the user when filling out the web forms.

27. The system of claim 26, wherein the obtained information is presenting to the user on a web page that is separate from the web site, said web page providing said functionality for the user to select the item for placement of an order.

28. The system of claim 26, wherein the sequence of two or more web forms is filled in by a proxy server that intercepts incoming web pages.

29. The system of claim 26, wherein the sequence of two or more web forms is automatically filled in and submitted without the user accessing the web site.

30. The system of claim 26, wherein the computing device is further operative to intercept incoming web pages of the web site and prevent such incoming web pages from being presented to the user.

31. The system of claim 26, wherein the computing device is further operative to inhibit the sequence of two or more web forms from being presented to the user.

32. The system of claim 26, wherein the computing device is further operative to, in response to the request from the user to order the item, automatically place an order for the item on behalf of the user.

33. The system of claim 26, wherein automatically filling in the sequence of two or more web forms comprises programmatically converting a portion of the user information into a format that complies with the web forms.

34. The system of claim 33, wherein programmatically converting the portion of the user information comprises applying a transformation function to the portion of user information.

35. The system of claim 26, wherein the automated form filing technology comprises using pattern matching to match portions of the user information to corresponding fields of the web forms.

36. The system of claim 26, wherein the automated form filling technology comprises a transaction wrapper associated with the web site and the sequence of two or more web forms is filled via execution of the transaction wrapper.

37. The system of claim 36, wherein the information about the item is obtained from the web site by execution of an information-gathering wrapper that is separate from the transaction wrapper.

38. The system of claim 26, wherein the request from the user to order the item is a request to order a plurality of items represented in an electronic shopping cart.

39. A tangible computer-readable storage medium which stores a computer program comprising:

- a data storage component that receives, and stores in a data repository, user information supplied by a user, including information suitable for conducting transactions via web sites; and
- an automated form filling component in communication with the data storage component, the automated form filling component operative to:
- programmatically obtain, from a web site, information about an item that can be ordered via the web site;
- present the obtained information to the user separately from the web site, in conjunction with functionality for the user to select the item for placement of an order; and
- in response to a request from the user to order the item, automatically fill in a sequence of two or more web forms of the web site with user information obtained from the data repository, and automatically submit the web forms, to at least partially automate a process of placing an order for the item, wherein the web forms are filled in and submitted using automated form filling technology that fills in the sequence of two or more web forms in a correct order without the web forms being presented to the user and without obtaining additional user information directly from the user when filling out the web forms.

* * * * *

UNITED STATES PATENT AND TRADEMARK OFFICE

CERTIFICATE OF CORRECTION

PATENT NO. : 7,660,744 B2
APPLICATION NO. : 11/069923
DATED : February 9, 2010
INVENTOR(S) : Philippe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1253 days.

Signed and Sealed this

Twenty-eighth Day of December, 2010

David J. Kappos
*Director of the United States Patent and Trademark Office*